United States Patent [19]

King et al.

[11] Patent Number: 5,087,315
[45] Date of Patent: Feb. 11, 1992

[54] FABRIC LIFTING APPARATUS AND METHOD

[75] Inventors: Alexander J. King; William M. Nimmo, both of East Kilbride, Scotland

[73] Assignee: The Secretary of State for Trade & Industry in Her Britannic Majesty's Government of the United Kingdom of Great Britain and Northern Ireland, London, England

[21] Appl. No.: 284,632

[22] Filed: Dec. 15, 1988

Related U.S. Application Data

[63] Continuation of PCT/GB88/00882 Oct. 19, 1988.

[30] Foreign Application Priority Data

Mar. 18, 1988 [GB] United Kingdom ............... 8806550

[51] Int. Cl.⁵ ............................................. B32B 31/16
[52] U.S. Cl. ..................................... 156/344; 156/584; 271/18.3
[58] Field of Search ................. 156/344, 584; 271/18.3

[56] References Cited

U.S. PATENT DOCUMENTS 4,283,047  8/1981  Blessing .
4,641,826  2/1987  van der Weide ................ 271/18.3
4,690,373  9/1987  Engle ............................ 271/18.3 X

FOREIGN PATENT DOCUMENTS 0156756 10/1985  European Pat. Off. .
2002750  9/1971  Fed. Rep. of Germany .
2202827A 10/1988  United Kingdom .

Primary Examiner—Robert A. Dawson
Attorney, Agent, or Firm—Nixon & Vanderhye

[57] ABSTRACT

Disclosed is a device for lifting a single layer of fabric or fiber reinforced plastic sheets from a stack of such sheets with minimal damage to the structure of the fabric. A frame and a flexible base plate are provided with a plurality of individual needle gripper devices located at opposite ends of the base plate. Each needle gripper device includes a needle of arcuate form rotatably mounted about an axis of its arc so that when the needle rotates, the tip of the needle will penetrate a fabric sheet upon which the apparatus is placed and then roll the sheet relative to the frame so that the sheet is peeled away from its original position without stretching or deformation of the fabric.

11 Claims, 6 Drawing Sheets

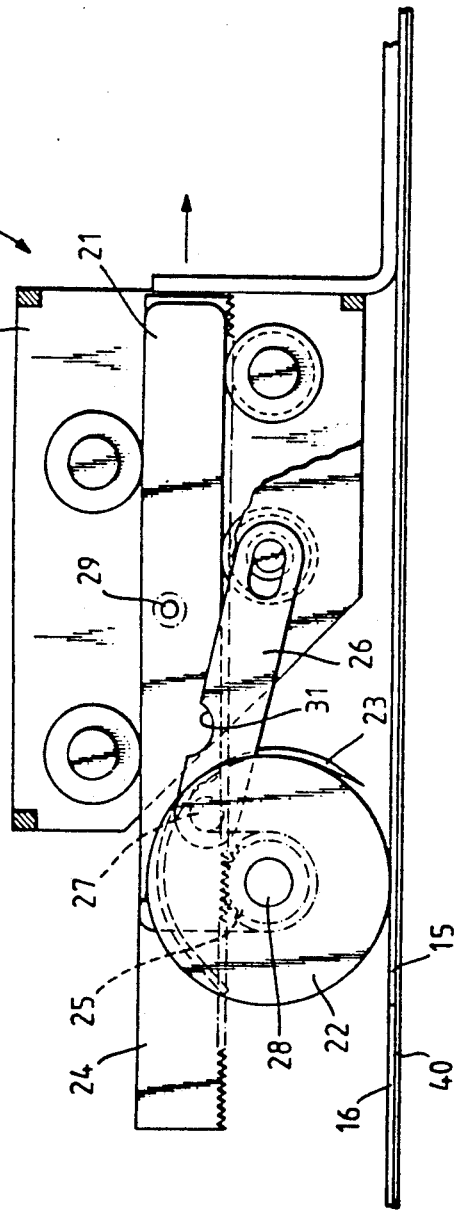
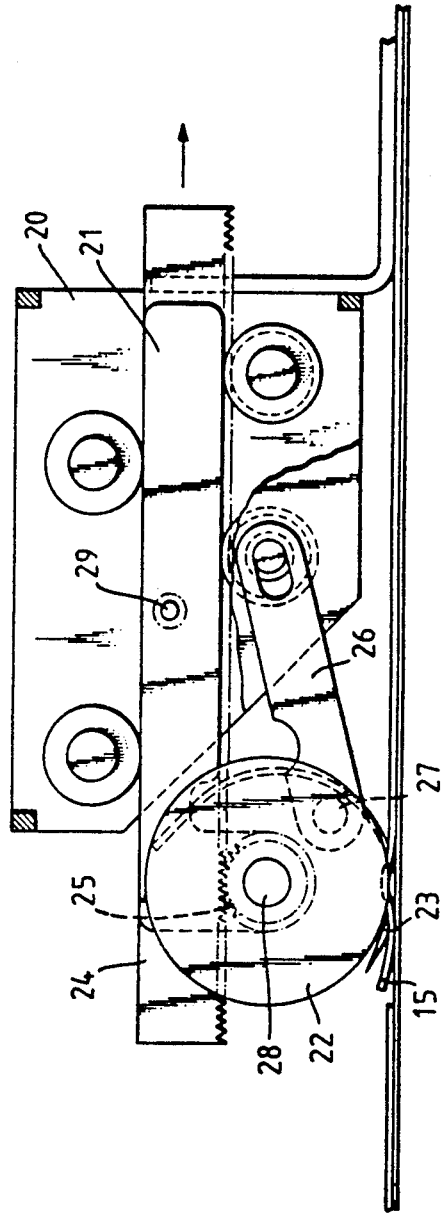
Fig.4a.
Fig.4b.

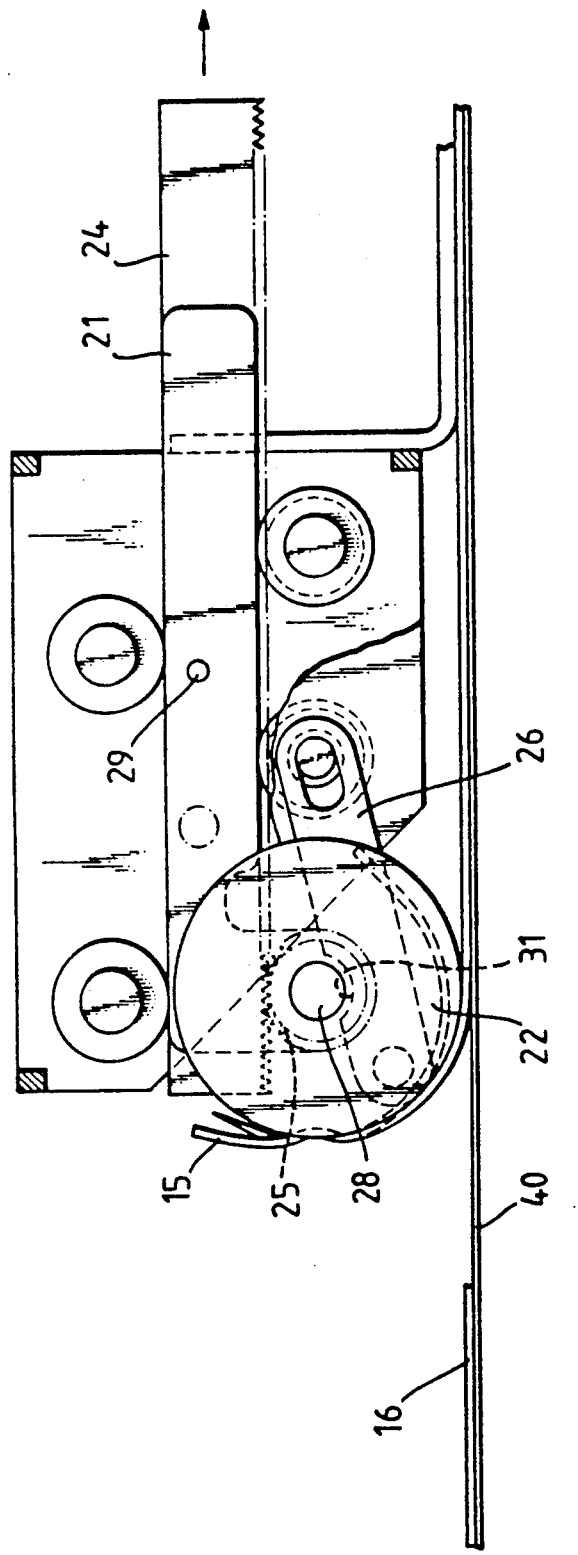

Fig.5.a
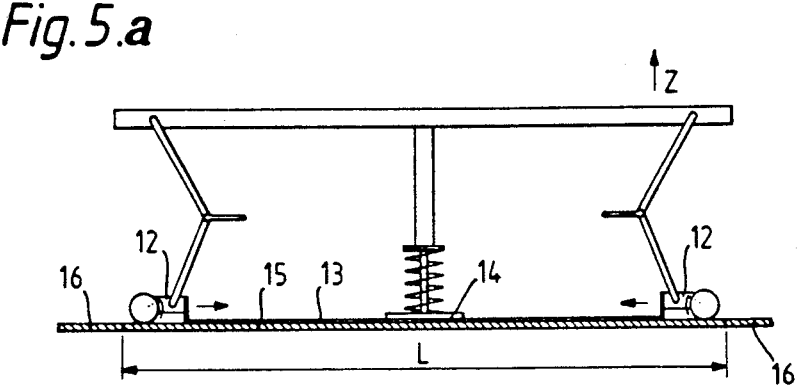
Fig.5b
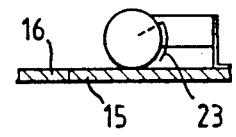
Fig.5c
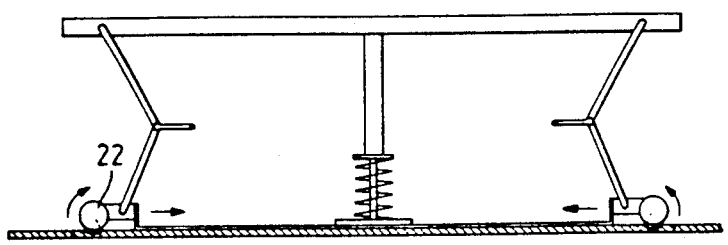
Fig.5d
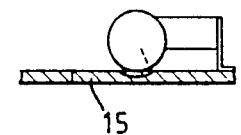
Fig.5e
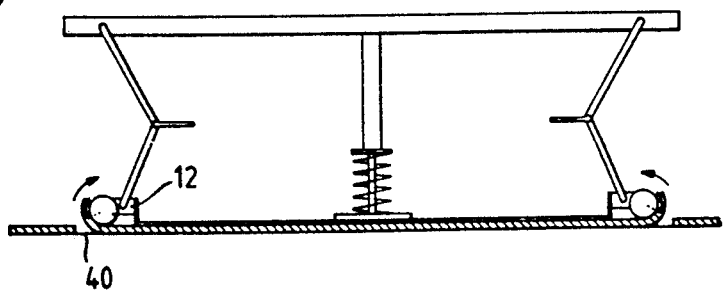
Fig.5f
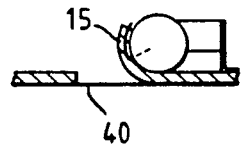

FABRIC LIFTING APPARATUS AND METHOD

This application is a continuation of PCT/GB88/00882 filed Oct. 19, 1988.

This invention relates to a fabric lifting apparatus and in particular to a fabric lifting apparatus which includes a number of individual needle gripper devices incorporated onto a frame which would be used for carefully lifting and laying sheets of material, and would be particularly suited to being mounted on an industrial robot arm.

The objective of the invention is to provide a lifting means which positively attaches and detaches sheets of woven materials such as Fibre Reinforced Plastic (FRP) cloths, with minimum damage to the structure of the fabric and which is suitable for incorporation in an automated environment, In such an environment, the materials may be impregnated with resin, are sticky and therefore require careful handling and accurate placing. In particular, the material may need to be separated from another sheet of material, such as a backing sheet, on which it is placed so the device must be sensitive enough to lift off, or peel off, only one sheet of material, whilst at the same time being strong enough to handle the peeling forces and the weight of the materials.

Fabric lifting devices are known, for example as described in German Patent Application no. 2002750. The apparatus described here, however, is only suitable for use with textile fabrics where a frame is fitted with a base plate having a plurality of slots through which arc-shaped needles may rotate and pierce the fabric beneath. The needles undergo a simple rotating motion so that the whole apparatus carries out a straightforward vertical lifting motion of the fabric. Clearly, this would not be suitable for fabrics such as FRP cloths which are sticky and delicate, and so need to be handled carefully.

Another prior art device is described in European Application no. 0166340 which describes a rather cumbersome device again using needles which rotate and pierce the material beneath. The device is again not suited for use with FRP cloth since only a simple vertical lifting of the material is achieved with this apparatus.

There is therefore a need for a fabric lifting apparatus which is capable of lifting single pieces of cloth, in particular FRP cloth, from a pile or from a backing strip attached to the cloth, without stretching and so causing minimum distortion to the cloth. Additionally, the apparatus should be suitable for use in an automated environment.

According to one aspect of the present invention there is provided a fabric lifting apparatus includes a rigid frame, a flexible base plate and a plurality of individual needle gripper devices located at opposite ends of the base plate, each needle gripper device including a needle of substantially arcuate form rotatably mounted about an axis of the arc, each device being so adapted that, in use, the needle first rotates about the axis, such rotation causing a tip of the needle to penetrate a fabric on which the device is placed and then rolls, such rolling causing a peeling action of the fabric away from its original position without stretching the fabric.

The flexible base plate is attached to the rigid frame preferably by linking bars and a spring-loaded register plate which is attached centrally to the frame, which helps prevent any stretching of the fabric.

With regard to the individual needle gripper devices, these are located at opposite ends of the base plate and preferably at least at each of the four corners. There is a need for each individual needle gripper device to be capable of rotating so as to grip the fabric, and subsequently to roll, so as to effect the peeling action. This is particularly needed when, for example, lifting a piece of fabric which is attached to a protective backing sheet.

Indeed, according to a second aspect of the present invention there is provided a needle gripper device for gripping a piece of pre-cut fabric which includes a housing, a bracket located substantially within the housing and attached to a cylinder, on which cylinder is attached circumferentially a curved needle, means for causing the cylinder firstly to rotate about its axis through a predetermined angle, such rotation, in use, causing a tip of the needle to enter fabric upon which the device is placed, and secondly, to roll through a predetermined angle, such rolling causing a peeling action of the fabric, without stretching, away from its original position.

Whilst the cylinder is rotating the bracket is kept stationary relative to the housing by means such as, for example a detent so as to prevent any rolling of the cylinder. However, once the cylinder has rotated through the predetermined angle, the detent is overcome, and the cylinder is made to roll and so peels the fabric away from its original position. Preferably rotation of the cylinder is effected by a rack acting on a pinion associated with the cylinder.

To accomodate large sheets and more accurate placement, a number of needle gripper devices may be located on the frame to act in coordination with each other.

According to a third aspect of the invention, a method of lifting fabric includes the steps of:

placing a fabric lifting apparatus, including a rigid frame, a flexible base plate and a plurality of individual needle gripper devices located at opposite ends of the base plate, onto a pre-cut panel of fabric, each needle gripper device including a needle of substantially accurate form rotatably mounted about an axis of the arc;

rotating each needle about its axis so that a tip of the needle penetrates the fabric;

rolling each needle, relative to the frame, so that the pre-cut panel is peeled away from its original position without stretching the fabric; and lifting the frame vertically to complete the peeling of the pre-cut panel of fabric away from its original position.

Fabrics such as FRP cloth are often attached to a protective backing strip. The above method, therefore, may also include the step of peeling the fabric away from a backing strip.

The present invention will now be described, by way of example only, with reference to the accompanying diagrammatic drawings, in which FIG. 1 is a side view of the fabric lifting apparatus according to the invention;

FIG. 4 is a three stage side view in section of the needle gripper device in FIGS. 2 and 3 in action; and FIGS. 5a through 5i show a five stage side view of the fabric lifting apparatus in use.

Figure 1:
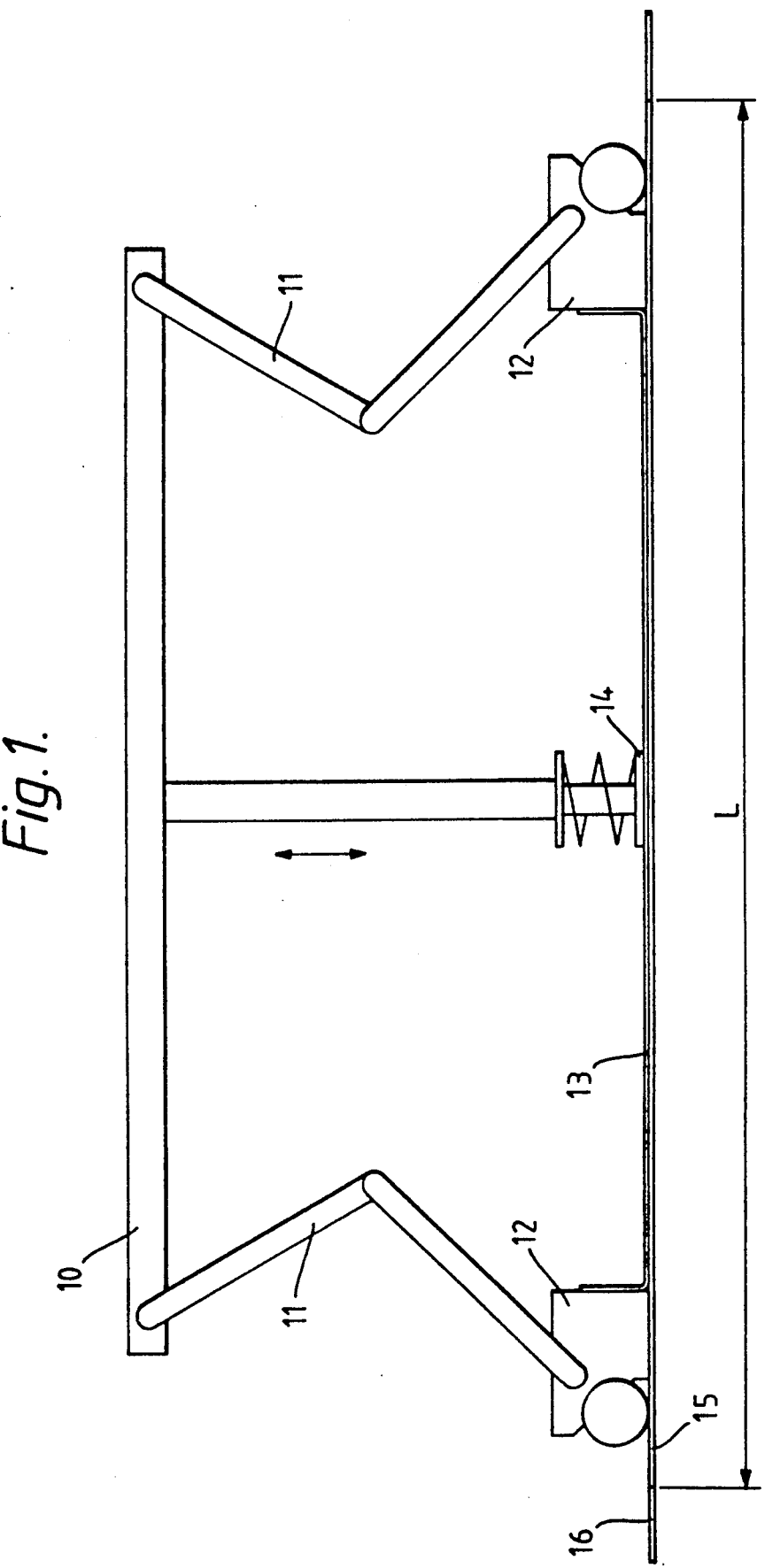

As shown in FIG. 1 a fabric lifting apparatus has a rigid frame 10 which is connected via connecting rods 11 to a plurality (only two shown here) of individual needle gripper devices 12, which are located and attached to opposite ends of a flexible but non-extensible base plate 13. The rigid frame 10 is centrally connected to the base plate 13 by a spring-loaded register plate 14. The apparatus is shown placed on top of a pre-cut panel 15 of length L of a sheet of material 16, for example FRP cloth.

Figure 2:
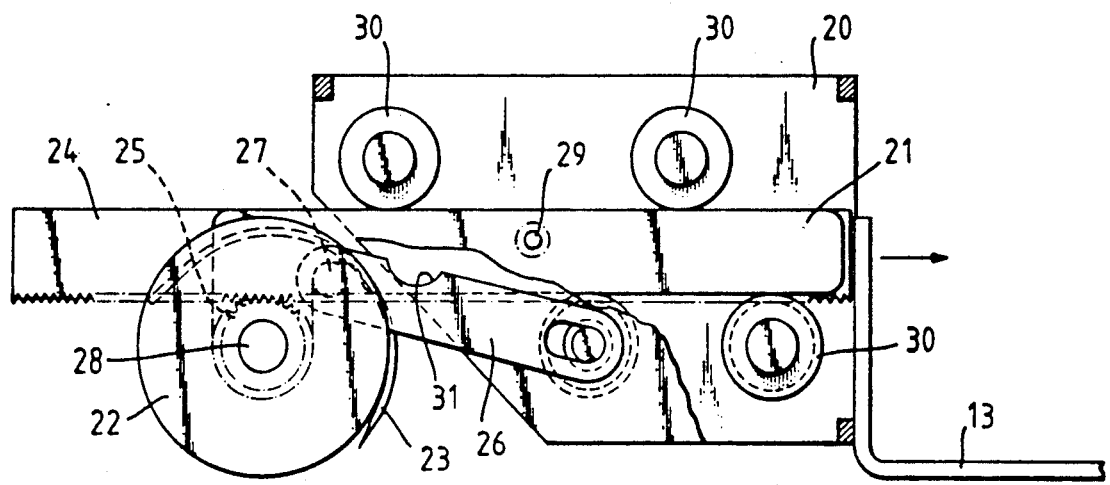
FIG. 2 is a side view in section of one of the needle gripper devices according to the invention.

A preferred embodiment of one of the individual needle gripper devices is shown in FIG. 2, where a housing 20 surrounds substantially a bracket 21 which is moveably connected to the ends of an axle 28 of a needle holder in the form of a cylinder 22 around which the cylinder 22 may rotate. A curved needle 23 is attached circumferentially to the cylinder 22. A rack 24 is engaged with a pinion 25 located at the centre of the cylinder 22 and attached to an actuator (not shown) at an end remote from the cylinder 22. A link member 26 is attached at one end to a point on the cylinder 22 via a pin 27 and at the other end to a point on the housing 20 and includes a slot 31. A detent locking pin 29 is provided between the housing 20 and the bracket 21. Roller guides 30 are also located within the housing. The device is shown attached to the flexible base plate 13.

Figure 3:
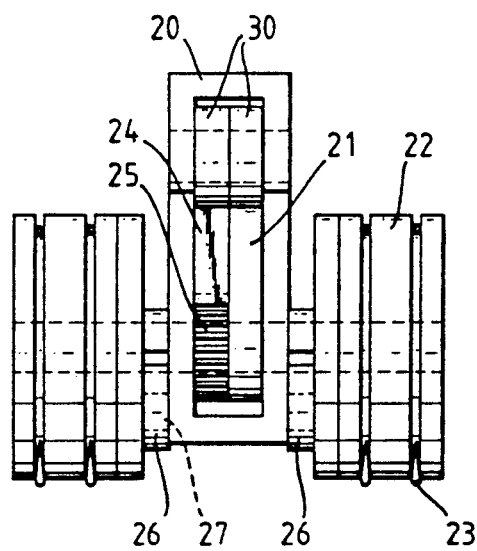
FIG. 3 is an end view of one embodiment of the needle gripper device shown in FIG. 2.

FIG. 3 shows an end view of a preferred embodiment of the device in FIG. 2. This particular embodiment has two cylindrical needle holders 22 each carrying two curved needles 23. Link members 26 are attached to each cylinder with pins 27 on one side and to the housing 20 on the other side. Located within the housing 20 are guide rollers 30 to guide the rack 24 and bracket 21 during movement. The pinion 25 acts on the axle 28 which runs through the whole device.

This embodiment is only an example of an arrangement of the needle holders 22 and housing 20. It will be realised that many other arrangements are possible with any number of needle holders 22 contained within the device.

The way in which the needle gripper device, as shown in FIG. 2 is actioned is shown in three stages at FIG. 4, where the device 12 is shown in conjunction with a pre-cut panel 15 of a sheet of material, say FRP material, 16 attached to a backing sheet 40. FIG. 4a shows the device 12 in its initial rest position in contact with the pre-cut panel 15 of material. FIG. 4b shows the intermediate position of the device 12 where the rack 24 has been moved horizontally relative to the housing 20 towards the centre of the device by the action on an actuator (not shown), thereby turning the pinion 25 and hence the cylindrical needle holder 22, through a 90° rotation. This causes the curved needle 23 to pierce and grip the pre-cut panel 15 of the material. The link member 26 also moves through an angle corresponding to the 90° rotation of the pin 27. The bracket 21 remains stationary relative to the housing 20 due to the engagement of the detent locking pin 29.

FIG. 4c shows the final position of the device where the detent locking pin 29 has become disengaged by the action of a tripping device (not shown) attached to the rack 24. The actuator continues to move the rack 24 and thus rotate the pinion 25 causing the bracket 21 to also move horizontally and thus causing the cylinder to roll towards the centre of the device. The link member 26 also moves through an angle of 90° until the axle 28 of the cylinder 22 becomes engaged in the slot 31 of the link member 26. This rolling motion of the cylinder 22 initiates a pulling action in which the pre-cut panel 15 is peeled away from the backing sheet 40 to which the sheet of material 16 is attached.

Figure 5G:
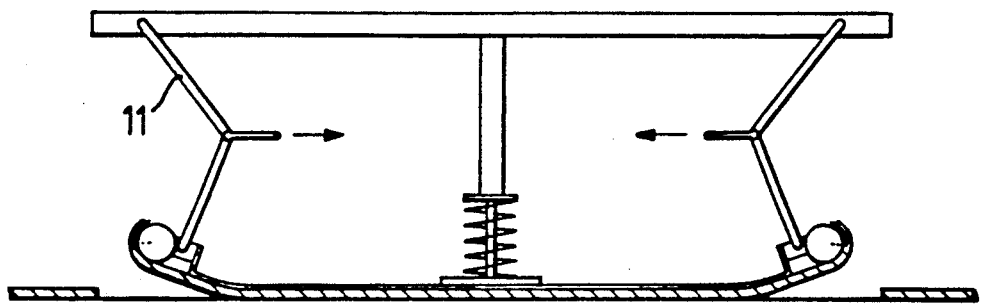

In FIG. 5 the action of a preferred embodiment of the complete fabric lifting apparatus peeling a piece of fabric away from a backing sheet is shown in six steps. Two individual needle gripper devices 12 are located at opposite ends of the base plate 13 in such a way that the movement of the cylinders 22 is in opposite directions and are operated in conjunction with the spring-loaded register plate 14 in the following way:

Step 1: The apparatus is lowered on to a pre-cut panel 15 within a sheet 16 of material which is held firmly in place against a suction table (not shown). In this position the needles 23 of the gripper devices 12 are fully withdrawn from the fabric, as shown in FIG. 5a and FIG. 5b, which corresponds to FIG. 4a;

Step 2: Acutators (not shown) cause the cylindrical needle holders 22 to rotate through an angle of 90°. The needles 23 enter the fabric panel 15 as shown in FIG. 5c and FIG. 5d at opposite ends of the panel 15. This corresponds to FIG. 4b.

Step 3: Actuators cause the cylinders 22 to roll through an angle of 90° towards the centres of the devices 12, causing the edges of the panel 15 to be peeled away from the backing material 40, as shown in FIG. 5e and FIG. 5f. This corresponds to FIG. 4c.

Step 4: Connecting rods 11 are pulled inwards towards the centre of the apparatus by the action of secondary actuators (not shown) which increases the peeling action.

Figure 5H:
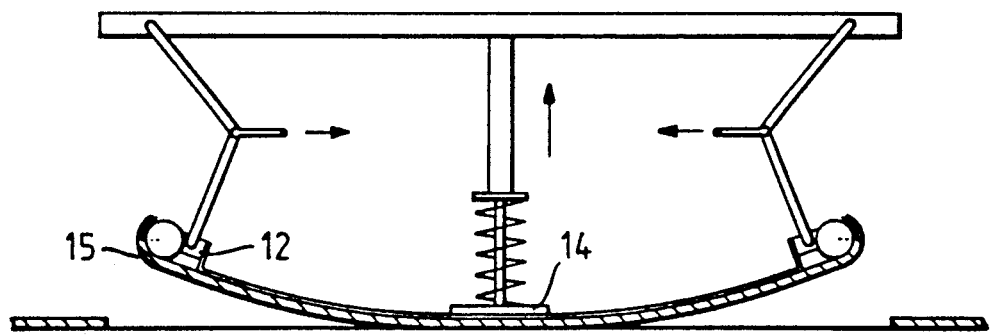

Step 5: The apparatus is raised vertically along the z-axis as shown in FIG. 5h, which may be by robot or machine, while the spring-loaded central register plate 14 ensures that the central portion of the panel 15 is last to leave the table. Such movement ensures negligible stretching of the panel length L (and panel breadth) so that distortion of the panel 15 is negligible. The gripper devices 12 and central register 14 retain the coordinate system of the lifting apparatus.

Figure 5I:
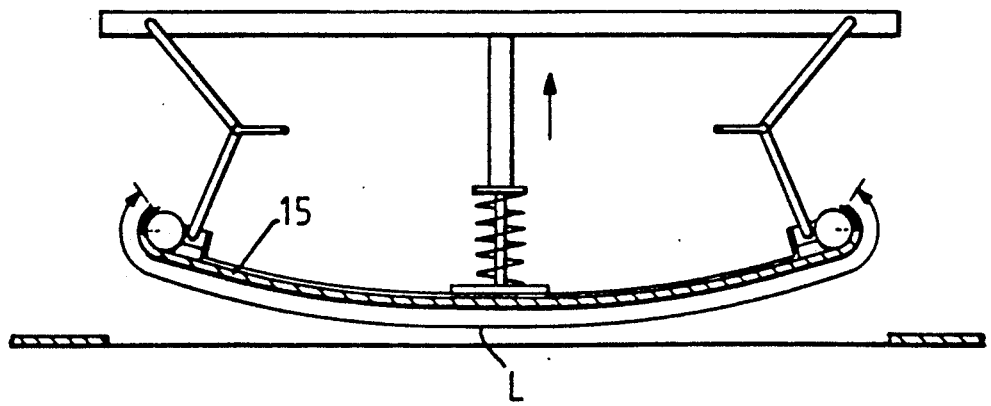

Step 6: The panel 15 is completely detached as shown in FIG. 5i and can be moved to a new position and off-loaded at a known location by a reverse sequence of the above steps.

To accommodate large sheets or more accurate placement any number of devices 12 may be attached to the base plate 13 of the apparatus. Typically, four devices would be located near the corners of a rectangular base plate. Alternatively banks of cylinders 22 may be located adjacent to each other and at opposing sides of the base plate 13.

It will be evident to those skilled in the art that the invention described will be applicable to many types of fabric including heavy and light woven fabrics as well as FRP cloth, and that whilst in some instances not all the features described will be required for operation, other applications may dictate that other features well-known in the art will need to be incorporated into the mechanism.

What is claimed is:

1. A fabric lifting apparatus comprising:
   a rigid frame;
   a flexible base plate; and
   a plurality of individual needle gripper devices located at opposite ends of the base plate, each needle gripper device including a needle of substantially arcuate form rotatably mounted about an axis of the arc, each device including means for causing the needle to first rotate about the axis wherein during such rotation a tip of the needle penetrates a fabric on which the apparatus is placed and said axis is stationary and after first rotation, said needle then rolls while said axis translates relative to the frame, such rolling causing a peeling action of the fabric away from its original position without stretching the fabric.

2. A fabric lifting apparatus as claimed in claim 1 wherein the flexible base plate is attached to the rigid frame by a plurality of linking bars, and attached centrally to the rigid frame by an extensible member.

3. A fabric lifting apparatus as claimed in claim 2 wherein the extensible member is a spring-loaded register plate.

4. A needle gripper device for use in the apparatus of claim 1 including a housing, a bracket located substantially within the housing and attached to a cylinder, on which cylinder is attached circumferentially a curved needle, means for causing the cylinder firstly to rotate about its axis through a predetermined angle, such rotation, in use, causing a tip of the needle to enter fabric upon which the device is placed, and secondly to roll through a predetermined angle, such rolling causing a peeling action of the fabric, without stretching, away from its original position.

5. A needle gripper device as claimed in claim 4 wherein the device also includes means for keeping the bracket stationary relative to the housing which, in use, prevents the cylinder from rolling whilst it is being made to rotate.

6. A needle gripper device as claimed in claim 4 wherein the means for causing the cylinder to and pinion.

7. A needle gripper device as claimed in claim 4 wherein the means for keeping the bracket stationary relative to the housing is a detent.

8. A needle gripper device as claimed in claim 4 wherein the cylinder is provided with shallow circumferential grooves in which the needles are located.

9. A needle gripper device as claimed in claim 4 wherein an array of needles is attached to the cylinder.

10. A method of lifting fabric including the steps of:
placing a fabric lifting apparatus, including a rigid frame, a flexible base plate and a plurality of individual needle gripper devices located at opposite ends of the base plate, onto a pre-cut panel of fabric, each needle gripper device including a needle of substantially arcuate form rotatable mounted about an axis of the arc;
rotating each needle about its axis so that a tip of the needle penetrates the fabric;
rolling each needle, relative to the frame so that the pre-cut panel is peeled away from its original position without stretching the fabric; and raising the frame vertically to complete the peeling of the pre-cut panel of fabric away from its original position.

11. A method as claimed in claim 10 which also includes the step of peeling the fabric away from a backing strip.

* * * * *